United States Patent
Breitlow

[19]

[11] Patent Number: 6,005,577
[45] Date of Patent: *Dec. 21, 1999

[54] PROCESS CONTROLLER WITH USER-DEFINABLE MENUING SYSTEM

[75] Inventor: Stanton H. Breitlow, Winona, Minn.

[73] Assignee: Watlow Electric Manufacturing, St. Louis, Mo.

[*] Notice: This patent issued on a continued prosecution application filed under 37 CFR 1.53(d), and is subject to the twenty year patent term provisions of 35 U.S.C. 154(a)(2).

[21] Appl. No.: 08/858,701

[22] Filed: May 19, 1997

[51] Int. Cl.⁶ ............................................. G06F 3/00
[52] U.S. Cl. ........................ 345/352; 345/333; 700/83
[58] Field of Search ................... 345/326–358, 345/146; 364/188–190; 700/83, 84, 85

[56] References Cited

U.S. PATENT DOCUMENTS

| | | | |
|---|---|---|---|
| 4,823,283 | 4/1989 | Diehm et al. | 345/352 |
| 4,896,291 | 1/1990 | Gest et al. | 345/353 |
| 5,121,477 | 6/1992 | Koopmans et al. | 345/352 |
| 5,179,653 | 1/1993 | Fuller | 395/156 |
| 5,220,675 | 6/1993 | Padawer et al. | 395/800 |
| 5,261,042 | 11/1993 | Brandt | 395/156 |
| 5,287,390 | 2/1994 | Scarola et al. | 364/188 X |
| 5,287,514 | 2/1994 | Gram | 395/700 |
| 5,291,190 | 3/1994 | Scarola et al. | 364/190 X |
| 5,345,550 | 9/1994 | Bloomfield | 345/353 |
| 5,367,626 | 11/1994 | Morioka et al. | 345/352 |
| 5,392,386 | 2/1995 | Chalas | 395/155 |
| 5,396,264 | 3/1995 | Falcone et al. | 345/352 |
| 5,420,975 | 5/1995 | Blades et al. | 395/156 |
| 5,470,218 | 11/1995 | Hillman et al. | 425/144 |
| 5,500,934 | 3/1996 | Austin et al. | 395/755 |
| 5,506,952 | 4/1996 | Choy et al. | 395/159 |
| 5,821,936 | 10/1998 | Shaffer et al. | 345/352 |

*Primary Examiner*—John E. Breene
*Attorney, Agent, or Firm*—Herzog Crebs & McChee, LLP

[57] ABSTRACT

A user-definable menuing system for use in a process controller or other limited output computer. The process controller is adapted to receive user input from a limited number of buttons and display user output using seven-segment display units. The user may view the current value of and/or change the value of a variety of parameters. The more frequently used parameters may be associated with positions in an easily accessible customizable menu. The less frequently used parameters as well as the customization process are accessed through the conventional means of a menu tree. The parameters are associated with positions in the customizable menu through a special configuration mode. One button is used to cycle through each menu position and another is used to cycle through available parameters within a given menu position. The associations are stored in non-volatile memory such as an EEPROM to prevent the need to reprogram the menu each time.

10 Claims, 5 Drawing Sheets

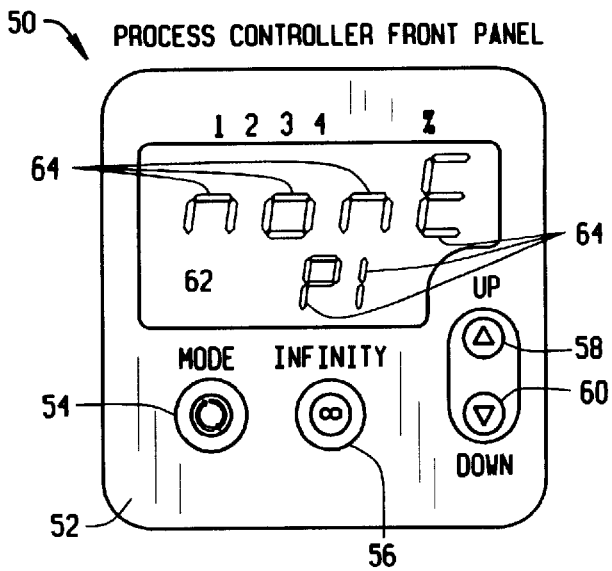

FIG. 2

| | |
|---|---|
| A-m | OPERATION MODE |
| Aut | AUTO-TUNE |
| Pcnt | PERCENT OUTPUT |
| CAL | CALIBRATION OFFSET |

FIG. 5

| | | | | |
|---|---|---|---|---|
| nonE | NONE | | dE2 | DERIVATIVE 2 |
| Pr2 | PROCESS 2 | | rE2 | RESET 2 |
| Pcnt | PERCENT OUTPUT | | rA2 | RATE 2 |
| rPSP | RAMPING SET POINT | | Ct2 | CYCLE TIME 2 |
| E St | EVENT INPUT STATUS | | db2 | DEAD BAND 2 |
| A-m | OPERATION MODE | | A2H | ALARM 2 HIGH |
| Aut | AUTO-TUNE | | A2LO | ALARM 2 LOW |
| AtSP | AUTO-TUNE SET POINT | | A3H | ALARM 3 HIGH |
| SP2 | SET POINT 2 | | A3LO | ALARM 3 LOW |
| E SP | EVENT SET POINT | | A4H | ALARM 4 HIGH |
| L-r | LOCAL OR REMOTE MODE | | A4LO | ALARM 4 LOW |
| CAL | CALIBRATION OFFSET | | P t | PROPORTIONAL TERM |
| Pb1 | PROPBAND 1 | | I t | INTEGRAL TERM |
| it1 | INTEGRAL 1 | | d t | DERIVATIVE TERM |
| dE1 | DERIVATIVE 1 | | hyS1 | HYSTERESIS 1 |
| rE1 | RESET 1 | | hyS2 | HYSTERESIS 2 |
| rA1 | RATE 1 | | Ahy2 | ALARM HYSTERESIS 2 |
| Ct1 | CYCLE TIME 1 | | Ahy3 | ALARM HYSTERESIS 3 |
| db1 | DEAD BAND 1 | | Ahy4 | ALARM HYSTERESIS 4 |
| Pb2 | PROPBAND 2 | | SP1 | SETPOINT 1 |
| it2 | INTEGRAL 2 | | | |

FIG. 3

PROCESS CONTROLLER WITH USER-DEFINABLE MENUING SYSTEM

FIELD OF THE INVENTION

The present invention relates generally to electronic menuing systems and more particularly to a user definable menuing system for process controllers.

BACKGROUND OF THE INVENTION

Industrial heaters are often controlled by specially configured electronic controller modules. In effect, these controller modules are small computers, complete with memory, a processing unit, a display for the output of information, and a means for the input of data from the user. Like more conventional, multi-purpose computers, the controller modules are ever increasingly powerful. With that power, however, comes complication and the loss of ease of use and "user-friendliness."

Recent models of process controllers, such as the Series 988 by Watlow Controls, Inc. of Winona, Minn., are extremely powerful, but that power in part comes from the ability to set well over 100 various parameters. With only a 2 by 4 array of seven-segment LED's to display all of the various parameters, the entry and altering of the parameters can often be a tedious task.

The Series 988 controls organize the different parameters into a tree with multiple branches, to facilitate easier access thereto, which may be referred to as menus. Nonetheless, it can take over 30 button pushes to reach a desired parameter, and on top of that, the user must know exactly under which branches and sub-branches of the menu tree the parameter lies. The positions of the various parameters are fixed at the time of manufacture, and are not adjustable.

Although, the particular problem has not been addressed with smaller devices that have only seven-segment displays for their output, and the intricacies that are thereby involved, others have tried to simplify the use of analogous menuing systems in personal computers and the like.

U.S. Pat. No. 5,261,042 to Brandt discloses a menuing system that keeps track of the different branches of the menu tree through which the user has traversed. It then allows the user to back track to any branch in the tree the user desires, by displaying the path taken to the current location in the menu tree with the press of a particular button. The user may then choose to go to any previous branch point, selected from the displayed list.

This solution is not complete, as the user must still know on which branch a particular menu lies. This system does, however, speed up the trial and error process of finding the desired menu. This system is also not suitable for a small computer such as a process controller, as there are no means to display the entire list of branches taken, at once.

U.S. Pat. No. 5,179,653 to Fuller, discloses a 3-tier menu system, which breaks up a large list of menu choices into different zones. One press of a button moves the user from one zone to any other zone. Once again, a process controller is not going to be able to take advantage of such a system, given its limited output.

U.S. Pat. No. 5,220,675 to Padawer et al. and U.S. Pat. No. 5,287,514 to Gram, both assigned to Microsoft Corporation, disclose customizable menus very similar to each other. In each case, the finished customized menu is easy to use, but the process of customizing the menu is not as simplified as possible and requires a complex user interface not available on a process controller.

It is an object of this invention to provide user-definable menuing system adaptable specifically for limited output computers, and more specifically for process controllers.

It is another object of this invention to provide a user-definable menuing system that can be used with a seven-segment array display. Other objects and features will be in part pointed out or become apparent from the description herein below.

SUMMARY OF THE INVENTION

In keeping with the above, the present system is contained within a process controller, usually for controlling industrial heating processes. The process controller has leads that control an actuator. Typically the actuator may be a power supply for a heater, compressor, or valve, but is by no means limited to such. The process controller also has other leads, which are connected to a feedback mechanism, such as, but not limited to thermocouples, RTDs, transmitters or similar devices. The controller also has a display, typically consisting of two rows of four seven-segment LED's. The user input comes from a keypad, usually having four buttons.

The present invention involves a menuing system which contains all of the components of a conventional menuing system of a process controller, plus the present invention adds additional components thereto. One additional component is a configurable menu which is easily accessible. Another additional component is a special mode for customizing the configurable menu.

During normal use, the process controller typically displays the current temperature at the location of the thermocouple and the "set point" or desired temperature for the location. In the prior art, the user would navigate from this point through a tree of menu items with several branches, using various buttons on the process controller. In the present menuing system, the user pushes the "cycle" button to cycle through the configurable menu items from the current temperature display.

A different key sequence is used to change modes. One of the available modes in the present menuing system is the customization mode. The user cycles through each of the positions in the configurable menu and can change the parameter associated with the position. One key sequence will step through the positions, while another key sequence will step through the available parameters for use with the configurable menu. The most frequently used parameters are selected for insertion into the configurable menu. Obviously, these selections will differ based on the particular application or process being controlled.

BRIEF DESCRIPTION OF THE DRAWINGS

So that the manner in which the above-recited features, advantages, and objects of the present invention are attained and can be understood in detail, a more particular description of the invention, briefly summarized above, may be had by reference to the embodiments thereof which are illustrated in the appended drawings.

It is noted, however, that the appended drawings illustrate only several typical embodiments of this invention and is therefore not to be considered limiting of its scope, for the invention may admit to other equally effective embodiments. Reference the appended drawings, wherein:

FIG. 2 is a front view of a process controller implementing the present menuing system, shown in the configuration stage;

FIG. 3 is a partial listing of available parameters for the present menuing system and the appearances thereof in seven-segment array display form;

FIG. 5 is a logical representation of the present menuing system in an OEM default configuration;

DETAILED DESCRIPTION OF THE DRAWINGS

Figure 1A:
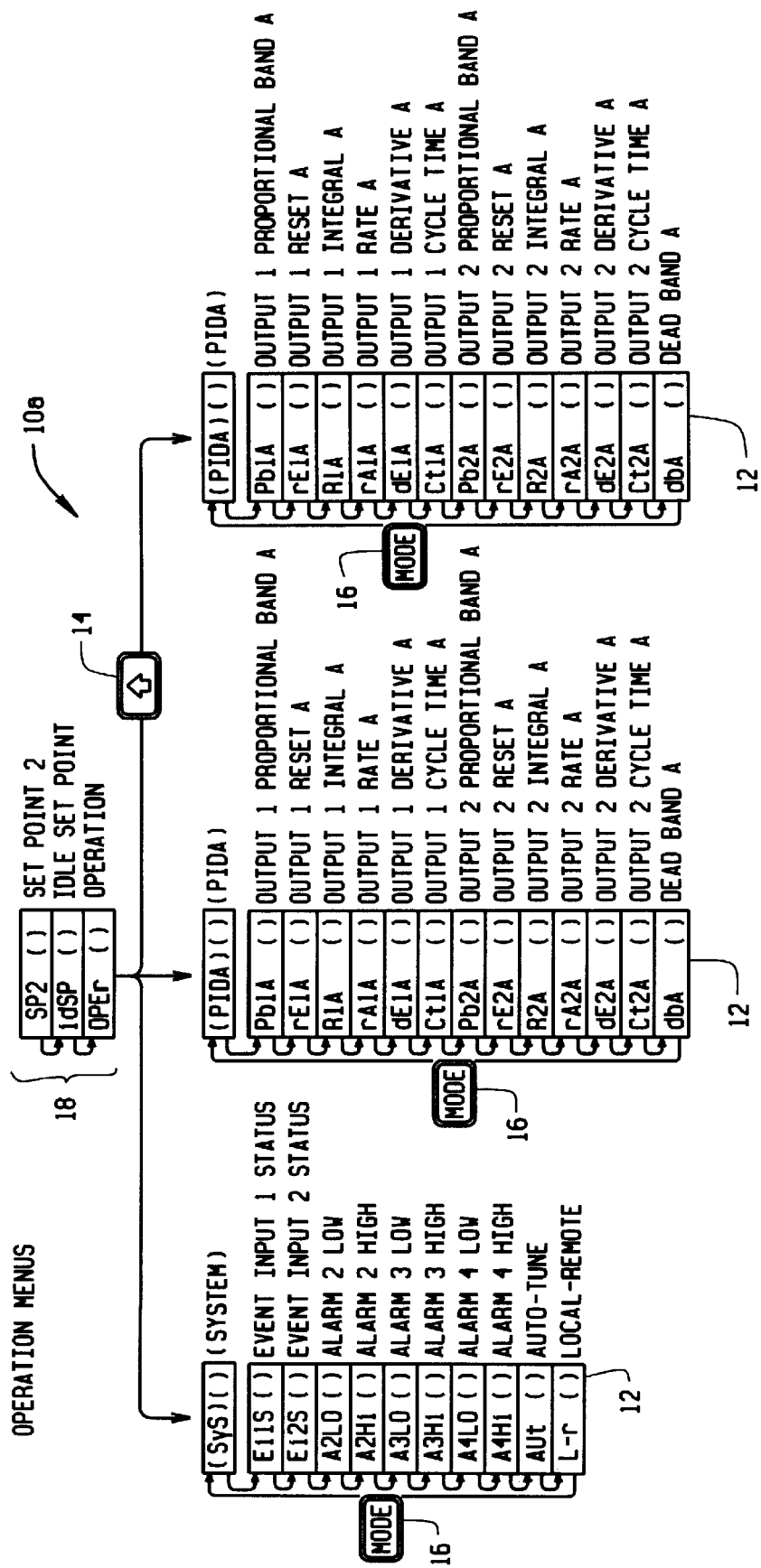
FIG. 1A is a schematic diagram of a first section of a prior art menuing system.
Figure 1B:
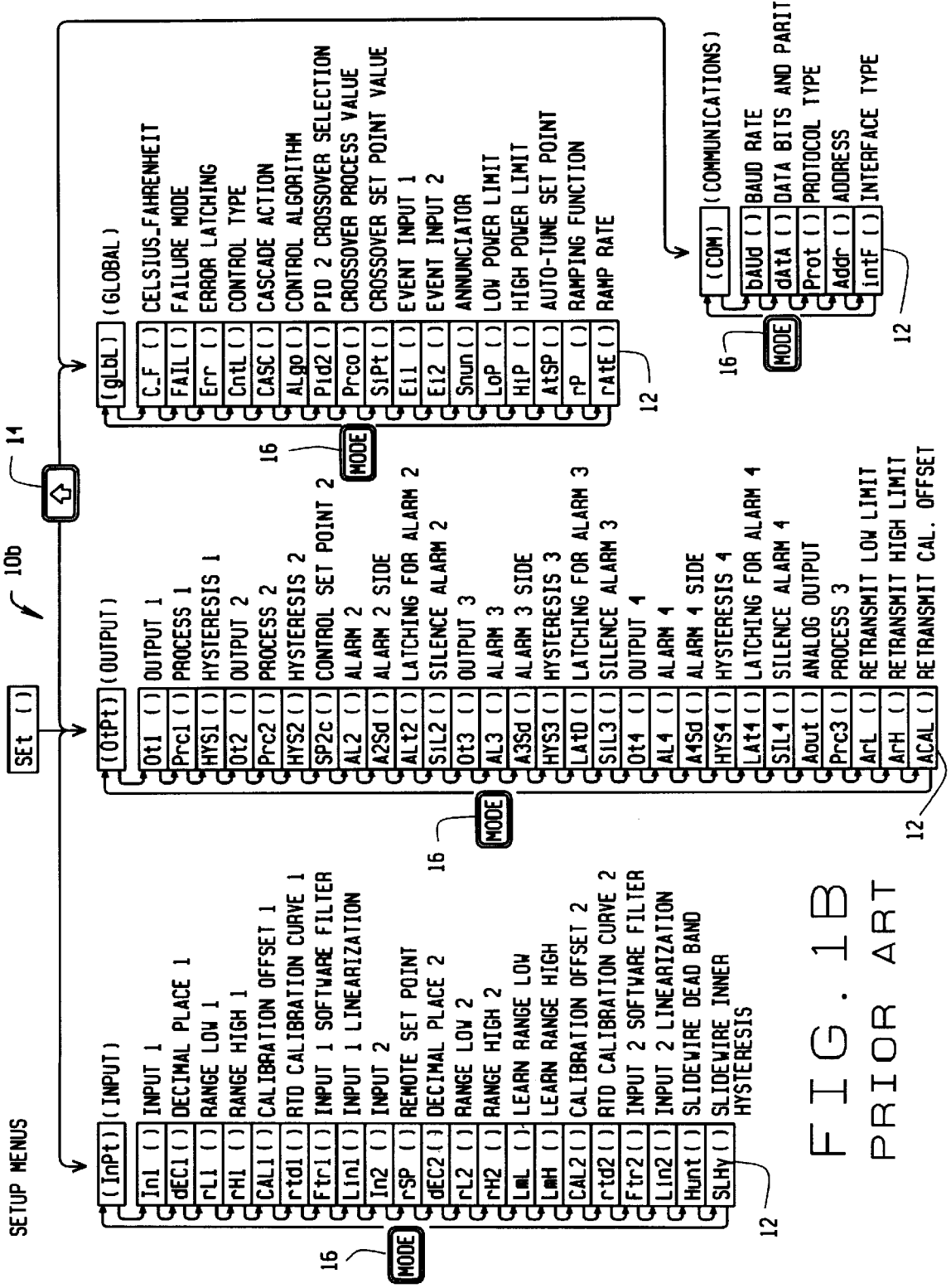
FIG. 1B is a schematic diagram of a second section of a prior art menuing system.
Figure 1C:
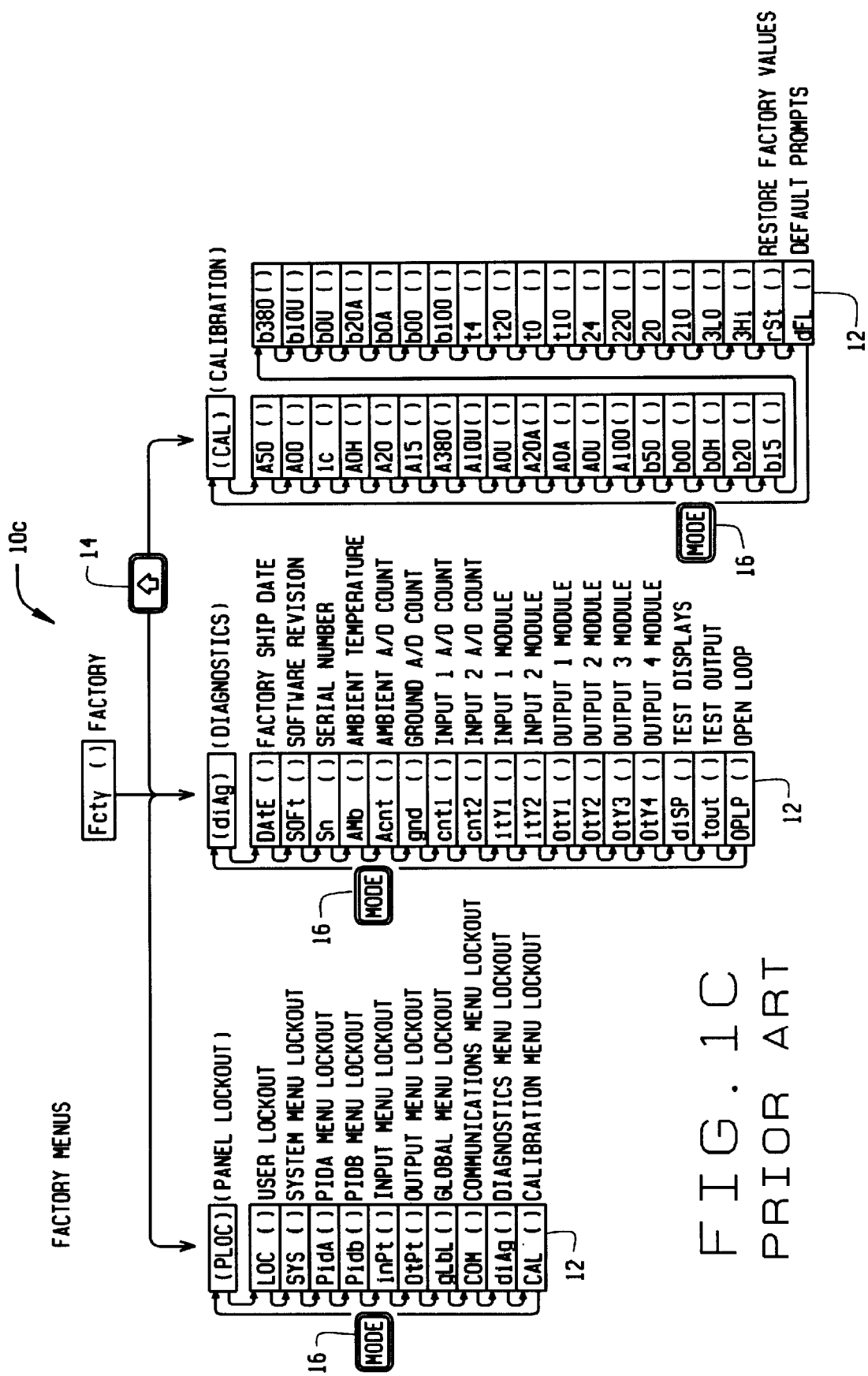
FIG. 1C is a schematic diagram of a third section of a prior art menuing system.

Referring now to FIGS. 1A–1C, the menu layout 10a–c is shown in three sections for a prior art menu system. This particular menu layout 10 is used with the Series 988 process controllers (not shown) by Watlow Controls, Inc. of Winona, Minn. During normal operation, if the user wants to adjust any parameters of the controllers, he or she will first have to determine in which menu section the desired parameter is located. The menu sections are named, "operation menus" 10a, "setup menus" 10b, and "factory menus" 10c. The user reaches each menu system by entering a predetermined key sequence, generally involving holding a plurality of keys simultaneous for a fixed length of time.

Each menu section 10a–c in turn, logically houses a plurality of menu branches 12, each with an appropriate name. From within each menu section 10a–c the user can press the up arrow button (logically represented by 14) to cycle through the various menu branches 12. Once the user finds the branch 12 containing the desired parameter, the mode button (logically represented by 16) is depressed one or more times to cycle through the parameters to the desired parameter.

As is readily seen it is often difficult for the user to find even frequently used parameters, because it is not possible to memorize the entire menu tree. Often the user will have to search through manual pages to find the location of the desired parameter, or use trial and error, haphazardly searching through the tree. A very small number of parameters may be stored at the very top of the tree 18. With this prior art system, however, no means are available for customizing which parameters go at the top of the tree 18. These parameters must be hard wired into the controller and will be the same for all users regardless of the application.

In FIG. 2 a process controller 50 is shown generally, which incorporates the present invention. Externally, the process controller 50 appears similar to its prior art counterpart. The front panel 52 of the process controller 50 comprises both input and output means. The input means consists of a plurality of buttons. In the preferred embodiment these include a mode button 54, an infinity button 56, an up arrow button 58, and a down arrow button 60. More or fewer buttons may be utilized.

The output means consists primarily of a display panel 62 composed of an array of seven-segment display units 64. The display units 64 are well known in the art and are found in many common everyday items such as most digital clocks. The display units 64 are typically either of the liquid crystal display (LCD) type or the light emitting diode (LED) type. There is no specific number of display units 64 that may be incorporated into the display panel 62, however enough should be used that sufficient information may be presented to the user, but not so many as to require that the process controller 50 be very large. The inventor has found that two rows of four display units each works well. Aside from the display units 64, the display panel could also have one or more individual LED's (not shown).

In addition to the user input and output means located on the front panel 52, the process controller 52 electronically receives input from one or more thermocouples (not shown) or temperature sensors. Similarly, the process controller 52 electronically sends output to a power supply (not shown) which feeds power to the heater(s) (not shown) being controlled. As the present invention can be adapted for use with a variety of process controller types, it should be stated more generally that the process controller 52 receives feedback from the process being controlled and correspondingly sends output signals to control said process.

Internally, the process controller 50 is a miniature computer. It comprises a microprocessor, memory, and a program, either physically stored in the memory or physically hardwired into the microprocessor. As noted above, it also has input and output means.

Figure 6:
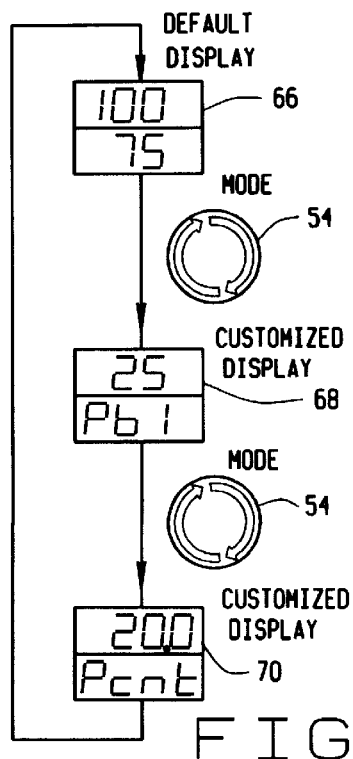
FIG. 6 is a logical representation of the present menuing system in use by an end user.

During normal operation as a heater process controller, the top row of the display panel 62 displays a preprogrammed default parameter, typically the temperature as reported by the thermocouple. Meanwhile, the bottom row of the display panel 62 typically displays the current set point, the target temperature at the location of the thermocouple. This default display configuration is shown as 66 in FIG. 6. The user can view the most frequently used parameters by pressing a single button. In the exemplary embodiment, the mode button 54 is used for this purpose. As seen in FIG. 6, pressing the mode button 54 once places the user at the first position 68 of the customizable menu 100, in this instance the user has chosen the "Proband 1" parameter for this position. At this point the user may change the parameter using the other keys.

Another depression of the mode button 54 places the user at the second position 70 of the customizable menu 100, in this instance the user has chosen the "Percent Output" parameter for this position. Each successive depression of the mode button 54 advances the user another position in the customizable menu 100. When the user reaches the last position of the customizable menu 100 that has a parameter assigned thereto, a depression of the mode button 54 returns the user to the default display 66.

Any number of positions may be used in the customizable menu 100. The preferred embodiment has sixteen positions in the configurable menu. This number allows room for all of the frequently used parameters most users will require, yet is small enough to keep the customization process simple. More than sixteen positions may be used, however if too many menu positions are created for the customizable menu 100, the advantage of the invention becomes diminished if not lost altogether. Likewise, less than sixteen positions may be used, however the fewer positions available to the user, the more likely the possibility that certain users will not have adequate space for all of their frequently used parameters.

Figure 4:
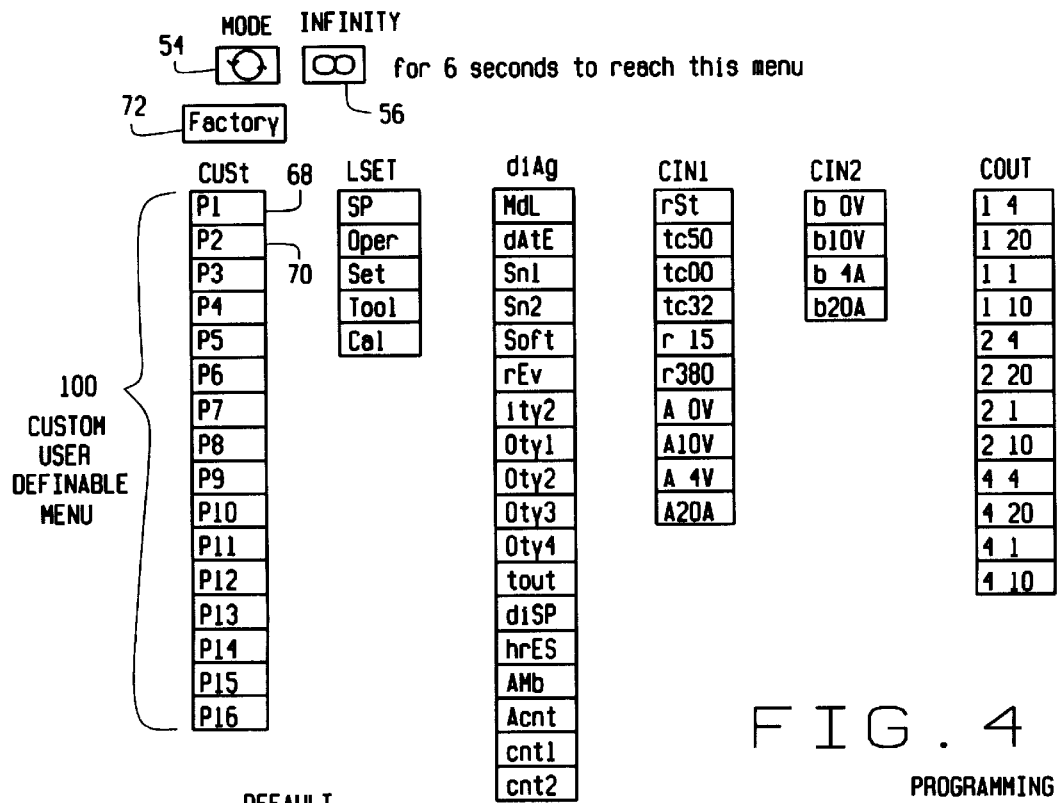
FIG. 4 is a schematic diagram of the "factory" section of the present menuing system.

As in the prior art, the present invention allows access to other menus by using more complex button sequences. This is necessary not only to reach the less frequently used parameters on the occasions when they are needed, but also to customize the customizable menu 100. The customization process can be seen in FIGS. 4 and 7. In the exemplary embodiment, the customization process is reached from the "Factory" menu 72. The "Factory" menu 72 is reached by simultaneously pressing the mode button 54 and the infinity button 56, and holding them for six seconds. The first option of the "Factory" menu 72 is the customization mode. When the user first enters the "Factory" menu 72 as described above, the display 62 will appear as shown in 74, with the letters, "CUSt" in the top row, and the letters, "FCtY" in the bottom row.

Figure 7:
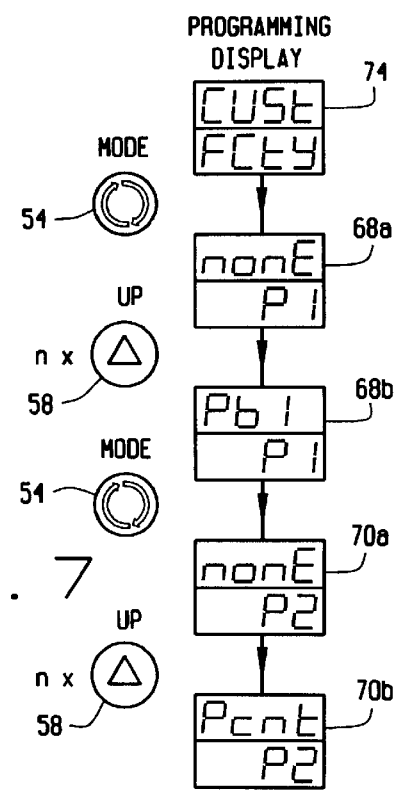
FIG. 7 is a logical representation of the present menuing system in the configuration stage.

From the customization option display 74, pressing the mode button 54 will begin the customization process for the first menu position 68. The process is shown in FIG. 7 as if all of the menu positions were empty. The menu position is indicated, preferably on the bottom row, by the letter "P" and position number, e.g. "P1" for the first menu position 68 and "P2" for the second menu position 70. The parameter associated with the menu position is indicated preferably on the top row with its designation using seven-segment display units, or with the letters "nonE" if no parameter has been associated therewith. FIG. 3 shows typical parameters and their respective designations using seven-segment display units.

It should be noted that the customized menu positions function as shortcuts to parameters. A parameter placed in a customizable menu 100 still exists in its original position in the standard conventional menu. When a parameter is placed in the customizable menu 100, therefore being found in two locations, changing the parameter from either place, will change the parameter as seen from both locations. Furthermore, when a parameter is hidden from view of the user due to the controller being in a certain mode of operation, the same parameter if located in the customizable menu is also hidden in the same manner. It is preferable, however, that even when a particular parameter is hidden from view, the menu item still be accessible for placement in the customizable menu 100. 68a is the display of the first menu position 68 in customization mode before a parameter has been entered. To associate a parameter with the menu position the user repeatedly depresses the up arrow button 58 until the desired parameter is displayed above the menu position indicator. The resulting display will appear similar to 68b. An additional depression of the mode button 54 results in the display 70a, allowing for the customization of the second menu position. Once again, the up arrow button 58 is depressed until the desired parameter is displayed above the menu position indicator as shown by 70b. This process is repeated until each frequently used parameter is associated with one of the menu positions. This will of course be limited by the number of available menu positions—sixteen in the preferred embodiment. When the user returns to the normal operating mode, the customizable menu 100 will appear as desired by the user for his or her particular application.

The values of each parameter, both those located inside and outside the customizable menu 100, and the associations of parameters with given menu positions are stored in electronic memory. While the process controller 50 is on, the parameter values and menu positions are preferably stored in a random access memory, such as SRAM. Such memory is volatile, losing its contents when power is lost or when the process controller 50 is turned off. Therefore, if SRAM or similar volatile memory is used, the parameters should also be stored in a non-volatile memory, such as an EPROM or EEPROM. When power is restored to the process controller or it is once again turned on, it should initialize its volatile memory with the parameter values and menu positions stored in the non-volatile memory. This eliminates the need for the user to reconfigure the customizable menu 100 each time the power is cycled on the process controller 50.

An original equipment manufacturer (OEM) may preset the customizable menu 100 with parameters particularly useful for a specific application. The OEM could then ship the process controller 50 preprogrammed with an entire system, alleviating any need for end user intervention. A typical such preprogrammed configuration is shown in FIG. 5.

While the foregoing is directed to the preferred embodiments of the present invention, other and further embodiments of the invention may be devised without departing from the basic scope thereof, and the scope thereof is determined by the claims which follow.

What is claimed is:

1. In a process controller having a microprocessor, a display in communication with the microprocessor, memory in communication with the microprocessor, a device input allowing communication between a first device coupled to the device input and the microprocessor, a device output allowing communication between a second device coupled to the device output and the microprocessor, a predefined menu structure stored in memory and including a set of predefined parameters whose values are selectable within a predetermined range of values, an input mechanism in communication with the microprocessor and responsive to user input that allows selection of the predefined parameters and their values, the improvement comprising means for compiling a user defined menu structure composed of a subset of the predefined parameters and storing said user defined menu structure in the memory, wherein said subset consists of fewer than all of the predefined parameters.

2. The process controller of claim 1, wherein the process controller includes a plurality of pre-defined menu structures storable in memory each having a set of predefined parameters, and the parameters for said user defined menu structure are user selectable via said input mechanism from the plurality of sets of predefined parameters.

3. A process controller comprising:
    a programmable microprocessor;
    memory in communication with said programmable microprocessor unit;
    a plurality of predefined menu structures stored in said memory, each said predefined menu structure having at least one predefined parameter whose value is variable and settable by a user;
    an input mechanism in communication with said programmable microprocessor unit and operable by the user to set said predefined parameters;
    a user definable menu structure storable in said memory and definable by the user through selection of at least one of said predefined parameters and fewer than all said predefined parameters; and
    a display in communication with said programmable microprocessor unit adapted to show said parameters.

4. The process controller of claim 3, wherein said display is a seven-segment type display.

5. The process controller of claim 4, wherein said display consists of a plurality of rows, each said row having a plurality of seven-segment display units.

6. The process controller of claim 3, wherein said memory is non-volatile.

7. A process/temperature controller comprising:
    an input for coupling the controller to a sensor;
    an output for coupling the controller to a heater;

a user input mechanism;

memory;

a display;

a processing unit in communication with said display, said memory, said device input, said device output, and said user input mechanism;

a plurality of preset menu structures stored in said memory and accessible by said processing unit, each said preset menu structure defined by a plurality of process and device parameters whose values are settable by a user through said user input mechanism;

a blank menu structure stored in memory and accessible by said processing unit, said blank menu structure definable by the user through selection of any number of said process and device parameters from said plurality of preset menu structures; and said processing unit programmed to control the heater according to the values of the menu structures and input from the sensor, and to show the parameters on the display.

8. The process/temperature controller of claim 7, wherein said display is a seven-segment type display.

9. The process/temperature controller of claim 8, wherein said display consists of a plurality of rows, each said row having a plurality of seven-segment display units.

10. The process/temperature controller of claim 9, wherein said memory is non-volatile.

* * * * *